E. G. BAILEY.
RADII AVERAGING INSTRUMENT.
APPLICATION FILED DEC. 18, 1913.
1,107,740.
Patented Aug. 18, 1914.
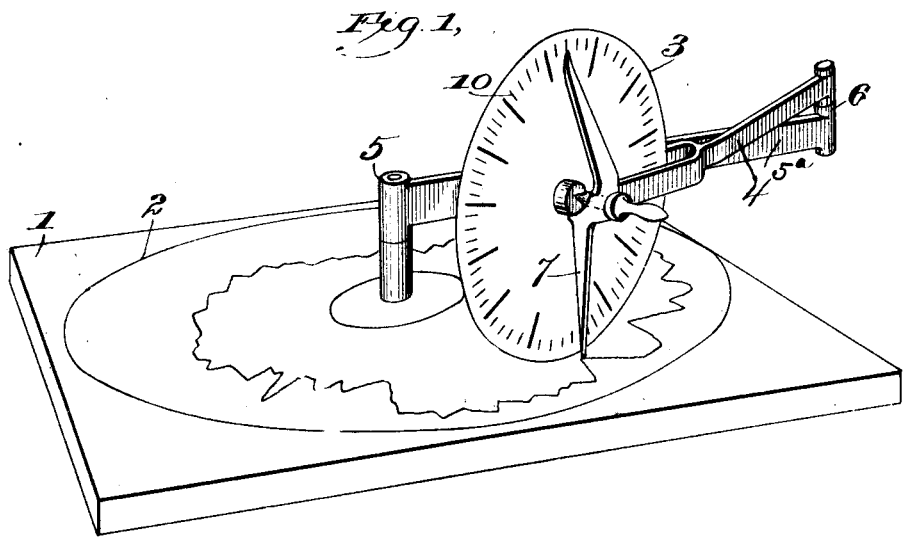
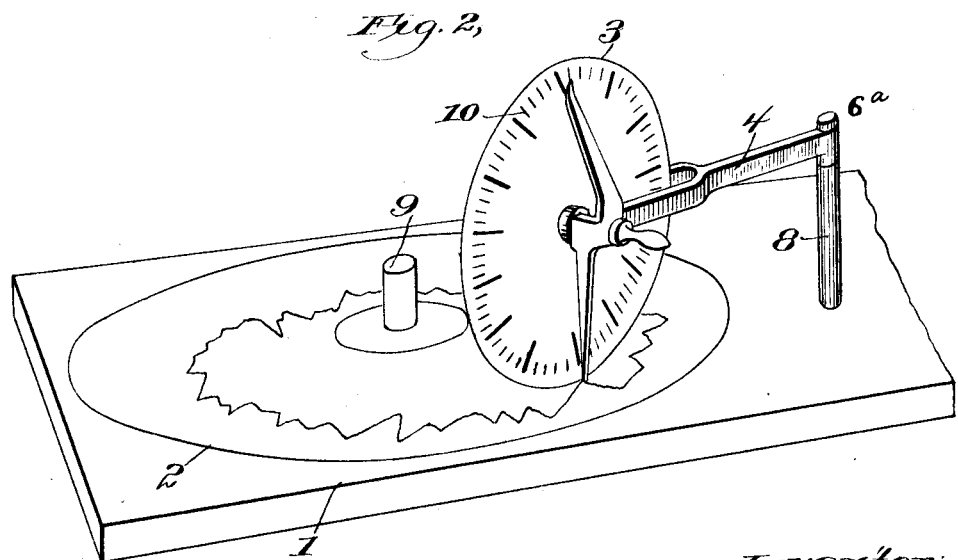
Witnesses:
Jas. J. Maloney.
Mary L. Maloney.
Inventor:
Ervin G. Bailey.
by H. J. Livermore
Atty.

UNITED STATES PATENT OFFICE.

ERVIN G. BAILEY, OF NEWTON HIGHLANDS, MASSACHUSETTS.

RADII-AVERAGING INSTRUMENT.

1,107,740.    Specification of Letters Patent.    Patented Aug. 18, 1914.

Application filed December 18, 1913. Serial No. 807,554.

*To all whom it may concern:*

Be it known that I, ERVIN G. BAILEY, a citizen of the United States, residing in Newton Highlands, in the county of Suffolk and State of Massachusetts, have invented an Improvement in Radii-Averaging Instruments, of which the following description, in connection with the accompanying drawings, is a specification, like letters on the drawings representing like parts.

The present invention relates to a radii averaging instrument, and is embodied in an instrument adapted to be used to determine the mean radial ordinate of a record or diagram drawn to polar coördinates on a circular chart. The integrating portion of the instrument consists of a wheel or disk, the axis of which is adapted to be maintained substantially parallel to the radius of the chart which passes through the point of contact between the disk and the chart, the said disk being adapted to be rotated by peripheral contact with the chart, as the tracer point follows the record.

The instrument embodying the invention is for the same purpose as that of the instruments shown and described in prior Letters Patent of the United States, No. 927,328, to William F. Durand, July 6, 1909, and No. 938,962, to William H. Bristol, November 2, 1909; but it has novel features of construction and arrangement in which it differs from the instruments shown in the patents cited, and which constitute important improvements.

Figure 1 is a perspective view of the instrument embodying the invention; and Fig. 2 is a similar view showing a modification.

The instrument is herein shown as consisting of a support 1 having a flat surface to receive the chart 2 which is located in a definite position with relation to the support. The integrating wheel 3 is mounted on an arm 4, the said arm having a pivotal bearing 6 perpendicular to the surface of the support, and the said arm and its bearing are so arranged with relation to the axis of the chart that the axis of the wheel 3 is always substantially parallel to that radius of the chart which passes through the point of contact between the chart and the wheel.

In the construction shown in Fig. 1, the perpendicular support for the arm 4 is shown as the vertical pivot 6 on a link 5ª which is pivoted at the opposite end on a perpendicular support 5 concentric with the chart, the integrating wheel 3 being supported on a pivotal bearing at the end of the arm 4 remote from the perpendicular support. In this instrument, the rotation of the integrating wheel can be brought about by moving the wheel with relation to the chart, or the chart with relation to the wheel, it being obvious that the pivot 6 will always be at a fixed distance from the center of the chart. The tracer 7 extends downward from the axis of the wheel to a point near the surface of the chart, the point of the said tracer preferably being close to the place where the wheel lies in contact with the chart. While I have shown the perpendicular support 5 for the link 5ª as part of a post utilized to center and hold the chart, it is obvious that the chart can be positioned and fastened in any suitable way, and the perpendicular support for the link likewise provided for.

In the construction shown in Fig. 2, the arm 4 has a stationary perpendicular axis which consists of a post 8 permanently secured to the support 1 at a point remote from the center of the chart, the pivot 6ª at the top of the post being the equivalent of the pivot 6. In this case, it is necessary to rotate the chart with relation to the wheel and I have shown the support 1 as provided with a vertical post 9 which constitutes a centering guide around which the chart can be rotated.

In view of the fact that the arm 4 is pivotally supported, the lateral movement of the wheel 3 is not exactly radial to the center of the chart; but since the pivotal support for that part of the arm which carries the wheel is at a distance from the center of the chart, the small portion of the arc along which the wheel travels, so closely coincides with the radius of the chart that the error is negligible in the use of the instrument.

The angular rotation of the wheel by its peripheral contact with the chart, while the tracer is caused to follow the diagram, is substantially proportional to the mean radius of the diagram, and the result can be indicated in any suitable way. In the construction shown, the arm which carries the wheel also carries an indicating pointer, which coöperates with a graduated scale 10 near the periphery of the wheel itself.

What I claim is:

1. A radii averaging instrument comprising a support having means for definitely positioning a circular chart thereon; an arm pivoted on an axis substantially perpendicular to the surface of said support; a tracing pointer connected with said arm; an integrating wheel rotatably pivoted to said arm on an axis substantially parallel to the radius of the chart which passes through the point of contact between said chart and said wheel, means whereby the axis on which the arm is pivoted is maintained equidistant from the axis of the chart and the integrating wheel equidistant from the axis of the arm.

2. A radii averaging instrument for circular chart records, comprising a support for a chart; an arm pivoted at one end about an axis substantially perpendicular to said support and at a fixed distance from the center of the chart; a tracing pointer fastened to said arm; and an integrating wheel rotatably pivoted to said arm, the axis of said wheel being substantially parallel to the radius of the chart passing through the point of contact with said wheel.

3. A radii averaging instrument for circular chart records, comprising a support for a chart; means for holding the center of the chart in a definite position on said support; a link pivoted at one end about the axis of the chart; an arm pivoted to the other end of said link; a tracing pointer fastened to the outer end of said arm; and an integrating wheel rotatably pivoted to the outer end of said arm, the axis of said wheel being substantially parallel to the radius of the chart passing through the point of contact with said wheel.

In testimony whereof, I have signed my name to this specification in the presence of two subscribing witnesses.

ERVIN G. BAILEY.

Witnesses:
JAS. J. MALONEY,
M. L. MALONEY.